July 15, 1924.

L. S. KEILHOLTZ

POWER DEVICE

Filed April 18, 1919

L. S. KEILHOLTZ 1,501,851

POWER DEVICE

Filed April 18, 1919

WITNESSES
Clifford D. Sachs
Warren Schmieding

INVENTOR
L. S. Keilholtz
Kerr, Page, Cooper and Hayward
ATTORNEYS

Patented July 15, 1924.

1,501,851

UNITED STATES PATENT OFFICE.

LESTER S. KEILHOLTZ, OF DAYTON, OHIO, ASSIGNOR, BY MESNE ASSIGNMENTS, TO DELCO-LIGHT COMPANY, OF DAYTON, OHIO, A CORPORATION OF DELAWARE.

POWER DEVICE.

Application filed April 18, 1919. Serial No. 290,986.

*To all whom it may concern:*

Be it known that I, LESTER S. KEILHOLTZ, a citizen of the United States of America, residing at Dayton, county of Montgomery, State of Ohio, have invented certain new and useful Improvements in Power Devices, of which the following is a full, clear, and exact description.

This invention relates to power devices and more particularly to portable power devices including a motor or other prime mover and a lubricant reservoir for supplying lubricant to the power device.

It is an object of the present invention to provide means to prevent the spilling of the lubricant contained in the reservoir in case the power device is overturned.

Other and further objects of the present invention will be apparent from the following description, reference being had to the accompanying drawings, wherein a preferred embodiment of the present invention is clearly shown.

Figure 1:
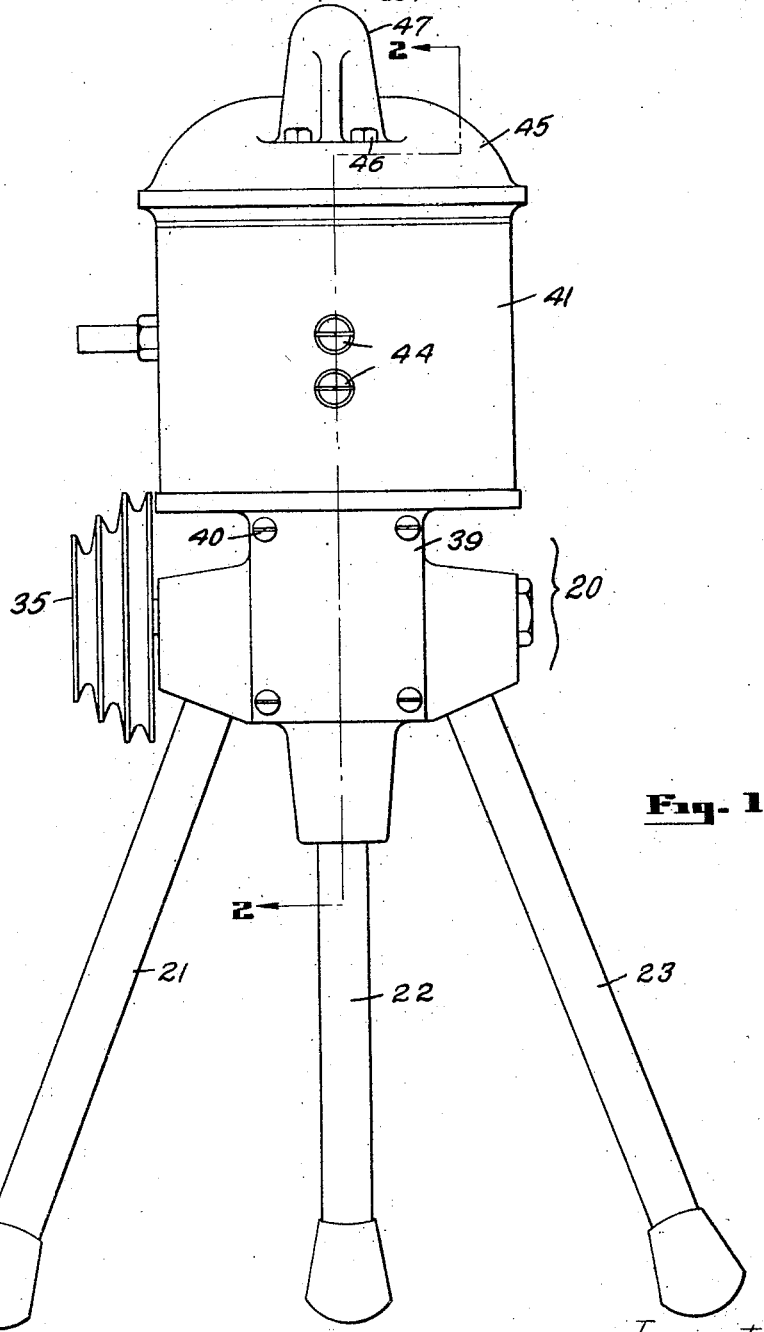
Fig. 1 is a side elevation of the power device.
Figure 2:
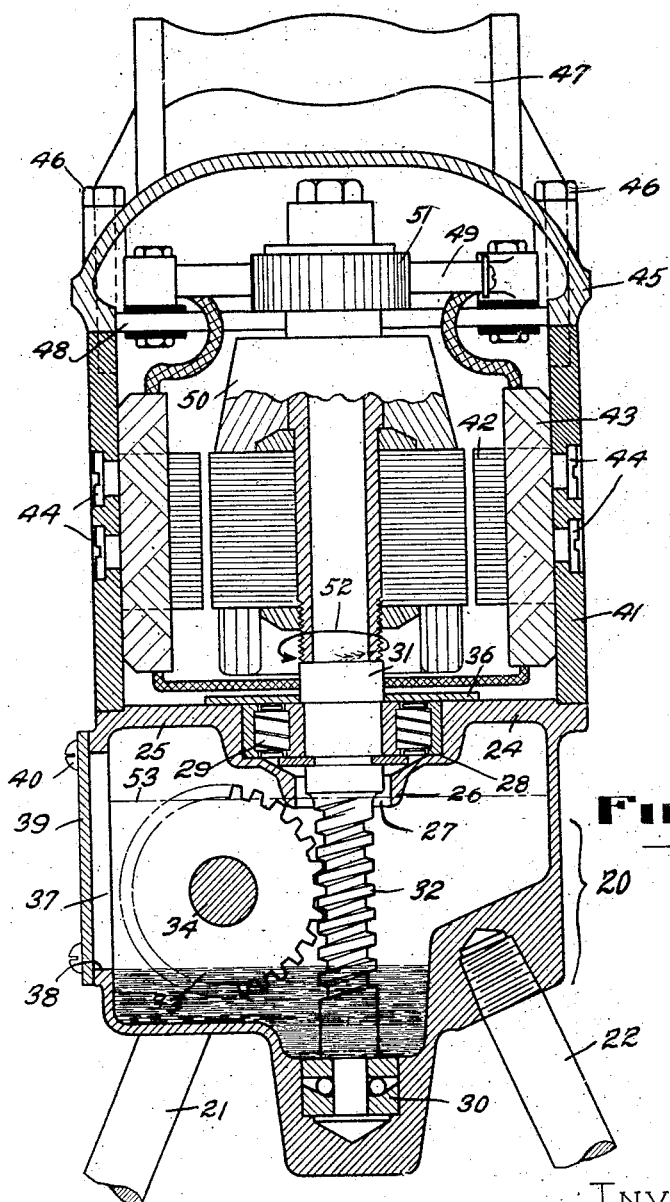
Fig. 2 is a longitudinal sectional view of said power device, the section being taken on line 2—2 of Fig. 1.

Referring to the drawings, the numeral 20 indicates a gear housing which is supported by legs 21, 22 and 23. The top of the housing 20 is provided with an enclosing wall 24 having a main surface 25 and a boss 26 provided with an aperture 27 and an annular recess 28 within which bearing 29 is mounted. At the bottom portion of housing 20 a step bearing 30 is provided. Said bearing 30 together with bearing 29 supports a main or armature shaft 31. The shaft 31 is provided with a worm 32 which cooperates with the gear 33 mounted on a countershaft 34. This shaft is provided with a pulley 35. A cover plate 36 mounted upon the enclosing wall 24 is used for holding the bearing 29 in its proper position.

Housing 20 is used as a lubricant reservoir for furnishing lubrication to the bearings 29 and 30 and gearing 32 and 33. An opening 37 is provided in the gear housing 20 and is mainly used for filling the gear housing with lubricant. The lower edge 38 of this opening 37 is located above the bottom of the housing 20, and determines the quantity of lubricant to be placed within the housing. The opening 37 is provided with a door 39 held in place by screws 40.

A shell 41 is mounted upon the enclosing wall 24 of the housing 20 and pole pieces 42 and field windings 43 are mounted on the shell 41 and held in place by screws 44. The upper portion of the shell is provided with a cover 45 held in place by bolts 46 and said cover is provided with a handle 47. A brush supporting plate 48 mounted on the shell 41 is provided with brushes 49. An armature 50 is mounted on armature shaft 31 and is provided with a commutator 51 which cooperates with brushes 49.

The operation of the device is as follows: When armature shaft 31 rotates in the direction indicated by the arrow 52, worm gear 33 will rotate in a counterclockwise direction, and will cause the rotation of shaft 34 which will in turn cause the rotation of pulley 35. A portion of gear 33 will always be submerged in the lubricant and when in operation will cause oil to be thrown upon the worm 32 and a portion thereof through aperture 27 into the bearing 29.

The quantity of oil poured into the gear housing is determined by the opening 37. It can readily be seen that when more lubricant is poured into the housing 20 the lubricant will tend to escape out over the lower edge 38 of the opening 37 before the door 39 can be secured in position. This predetermined quantity of lubricant is such that when the power device is overturned in any position the lubricant cannot spill out. The boss 26 forms a wall around the main shaft 31 which extends to such a distance from the wall surface 25 that when the power device is partly overturned or entirely inverted, lubricant is prevented from escaping through the aperture 27 and entering into the motor. The level of the lubricant while the motor is in inverted position, will be at its highest point indicated by line 53.

It will be apparent from the foregoing description that certain advantages are present in this invention. The opening in the side of the gear housing determines the quantity of lubricant to be placed within the gear housing and will prevent the attendant from placing too much lubricant in the housing. Should the attendant attempt to place more lubricant in the housing, the lubricant would escape out over the lower edge of the opening.

The worm gear, when rotating while partly submerged in the lubricant, will cause the lubricant to be splashed upon the worm and against the upper wall of the housing. A portion of the lubricant splashed against the upper wall will be directed through aperture 27 onto the bearing. The lower bearing is always submerged in the lubricant. As can be seen this power device needs no attention after the gear housing is filled with lubricant to the determined level.

Another advantage in the present invention is that should the power device be overturned, the escape of lubricant is prevented. When the power device is overturned, the boss projects a substantial distance from the enclosing wall to form with the walls of the housing a reservoir. This reservoir is adapted to contain the maxium amount of lubricant that can be placed in the gear housing when the device is in the upright position.

While the form of mechanism herein shown and described constitutes a preferred form of embodiment of the invention, it is to be understood that other forms might be adopted, all coming within the scope of the claims which follow.

What I claim is:

1. In a power device, the combination with a prime mover including a driving shaft; of a gear housing connected with the prime mover and provided with bearing means supporting the driving shaft, said gear housing being adapted to contain a quantity of lubricant; gearing supported for rotation within the housing and arranged to supply lubricant to said bearing means; means to prevent filling the housing above a certain height; and means to prevent escape of the predetermined quantity of the lubricant when the power device is overturned.

2. In a power device, the combination with a prime mover including a driving shaft; of a gear housing connected with the prime mover and provided with bearing means supporting the driving shaft, said gear housing being adapted to contain a quantity of lubricant and having an opening the lower edge of which is adapted to prevent filling the housing above a certain height; gearing supported for rotation within the housing and arranged to supply lubricant to said bearing means, and a boss projecting from the main surface of the enclosing wall to prevent the escape of the predetermined quantity of the lubricant when the power device is overturned.

3. In a device of the kind described, a reservoir adapted to contain a predetermined quantity of liquid and having an opening providing unrestricted communication to the atmosphere; cooperating means associated with the opening to prevent the escape of any liquid through said opening when the reservoir is overturned.

4. In a device of the kind described, a reservoir adapted to contain a predetermined quantity of liquid and having an opening providing an unrestricted communication to the atmosphere; of a boss associated with the opening to prevent the escape of any liquid through said opening when the reservoir is overturned.

5. In a device of the kind described, a reservoir adapted to contain a predetermined quantity of liquid and having an opening providing unrestricted communication with the atmosphere; means to prevent filling the housing above a certain level; of a boss associated with the opening to prevent the escape of any liquid through said opening when the reservoir is overturned.

6. In a device of the kind described, a gear housing adapted to contain a predetermined quantity of lubricant, and having unrestricted communication with the atmosphere; and means preventing the escape of any lubricant out of the housing when the housing is overturned.

7. In a device of the kind described, a housing for mechanism adapted to enclose a predetermined quantity of lubricant and having an aperture in the wall thereof; and means adjacent the aperture to prevent the escape of any lubricant when the housing is overturned.

8. In a device of the kind described, a housing for mechanism adapted to enclose a predetermined quantity of lubricant, a boss on the wall of the housing said boss having an aperture therethrough, whereby communication is maintained at all times with the atmosphere and all the lubricant is prevented from escaping when the housing is upset.

9. In a device of the character described, a gear housing having an opening through the wall thereof and adapted normally to contain lubricant to a predetermined level; power transmitting means extending through the opening; and a boss surrounding the opening and extending inwardly into the gear housing whereby to prevent the escape of any lubricant through the opening when the gear housing is overturned.

10. In a device of the character described, a gear housing having an opening through the wall thereof and adapted normally to contain a predetermined quantity of lubricant; a boss surrounding said opening and arranged to receive a bearing; a driving shaft extending through the bearing and opening, said opening being arranged to direct splashed lubricant onto the bearing and said boss extending inwardly from the wall of the housing sufficiently to prevent the escape of any flowing lubricant through the opening and bearing when the gear housing is overturned.

11. In a device of the character described, a gear housing having an opening through the wall thereof and adapted normally to contain a predetermined quantity of lubricant; a boss surrounding said opening and arranged to receive a bearing; a driving shaft extending through the bearing and opening, said opening being arranged to receive lubricant splashed in a direction approximately parallel to the driving shaft and said boss extending inwardly from the wall of the housing sufficiently to prevent the escape of any flowing lubricant through the opening and bearing when the gear housing is overturned.

12. In a device of the character described, a gear housing adapted to contain a quantity of lubricant and having an opening in the top wall thereof; a substantially vertical driving shaft extending through said opening; means in the side wall thereof whereby the supply of lubricant may be replenished, said means preventing the filling of the housing above a predetermined level; and a boss surrounding said opening and extending inwardly sufficiently to prevent the escape of any lubricant through the opening when the gear housing is overturned.

13. In a portable power stand, the combination with supporting legs; of a top member comprising a gear housing, bosses in the top and bottom walls thereof, a vertical shaft journaled in said bosses and supported entirely thereby, a motor supported on said gear housing comprising a rotor carried by said shaft, a boss in the side wall of said gear housing, a substantially horizontal countershaft journaled in said boss, gearing between said vertical shaft and said countershaft, a driving pulley carried by said countershaft, means comprising an opening in said housing closed by a removable cover adapted to provide access to said gearing and to permit the introduction of lubricant, the lower edge of said opening being above the top of the boss in the bottom wall of said gear housing.

14. In a portable power stand, the combination with supporting legs; of a top member comprising a gear housing, bosses in the top and bottom walls thereof, a vertical shaft journaled in said bosses and supported entirely thereby, a motor supported on said gear housing comprising a rotor carried by said shaft, a boss in the side wall of said gear housing, a substantially horizontal countershaft journaled in said boss, gearing between said vertical shaft and said countershaft, a driving pulley carried by said countershaft, means comprising an opening in said housing closed by a removable cover adapted to provide access to said gearing and to permit the introduction of lubricant.

15. In a portable power device, the combination with a gear housing having upper and lower bearings, an upright shaft journaled in said bearings and supported entirely thereby, gearing in said housing adapted to cooperate with said shaft, and means comprising an opening in the housing closed by a removable cover adapted to provide access to said gearing and to permit the introduction of lubricant, the lower edge of said opening being above the top of the lower bearing, whereby when the housing is filled with lubricant to the lower edge of the opening said upright shaft will run in the lubricant.

16. In a portable power stand, the combination with supporting legs; of a top member comprising a gear housing, bosses in the top and bottom walls thereof, a vertical shaft journaled in said bosses and supported entirely thereby, a motor supported on said gear housing comprising a rotor carried by said shaft, a boss in the side wall of said gear housing, a substantially horizontal countershaft journaled in said boss, gearing between said vertical shaft and said countershaft, and a driving pulley carried by said countershaft.

17. In a power device, the combination with a gear housing, an opening in the wall thereof, an upper bearing in said opening, a lower bearing in said housing, an upright shaft journaled in said bearings and supported entirely thereby, said shaft extending above the housing, an electric motor supported on said gear housing and comprising a rotor carried by said shaft, a gear carried by said shaft within said housing, said rotor, upright shaft, and gear carried thereby being removable upwardly as a unit.

18. In a portable power stand, the combination with a motor stator comprising a shell; of a gear housing supporting the shell, and provided with vertically aligned bearings and horizontally aligned bearings; legs for supporting the gear housing and attached thereto; a rotor shaft journaled in the vertical bearings and entirely supported thereby; a countershaft journaled in the horizontal bearings; gearing between the rotor shaft and the countershaft; a motor rotor and a commutator carried by the rotor shaft; a brush supporting plate carrying brushes supported by the shell; and a cover secured to the shell.

19. In a portable power stand, the combination with supporting legs; of a top member comprising a box like housing having side walls and a bottom wall and a top wall, and comprising a boss projecting below the bottom wall and provided with a step bearing; a bearing in the top wall aligned with said step bearing; a dynamo-electric machine comprising rotor and stator elements, the stator element mounted on the top wall, and the rotor element journaled in and entirely supported by the step bearing and the bearing in the top wall; a countershaft journaled in bearings in the side walls; gearing between the countershaft and the rotor element; a pulley on the countershaft; and a cover mounted on the stator element.

In testimony whereof I affix my signature.

L. S. KEILHOLTZ.

Witnesses:
 HAZEL SOLLENBERGER,
 MILDRED PEARE.